No. 12,850. REISSUED SEPT. 8, 1908.
P. P. DYKE.
SHAFT BENDING MACHINE.
APPLICATION FILED JULY 18, 1908.
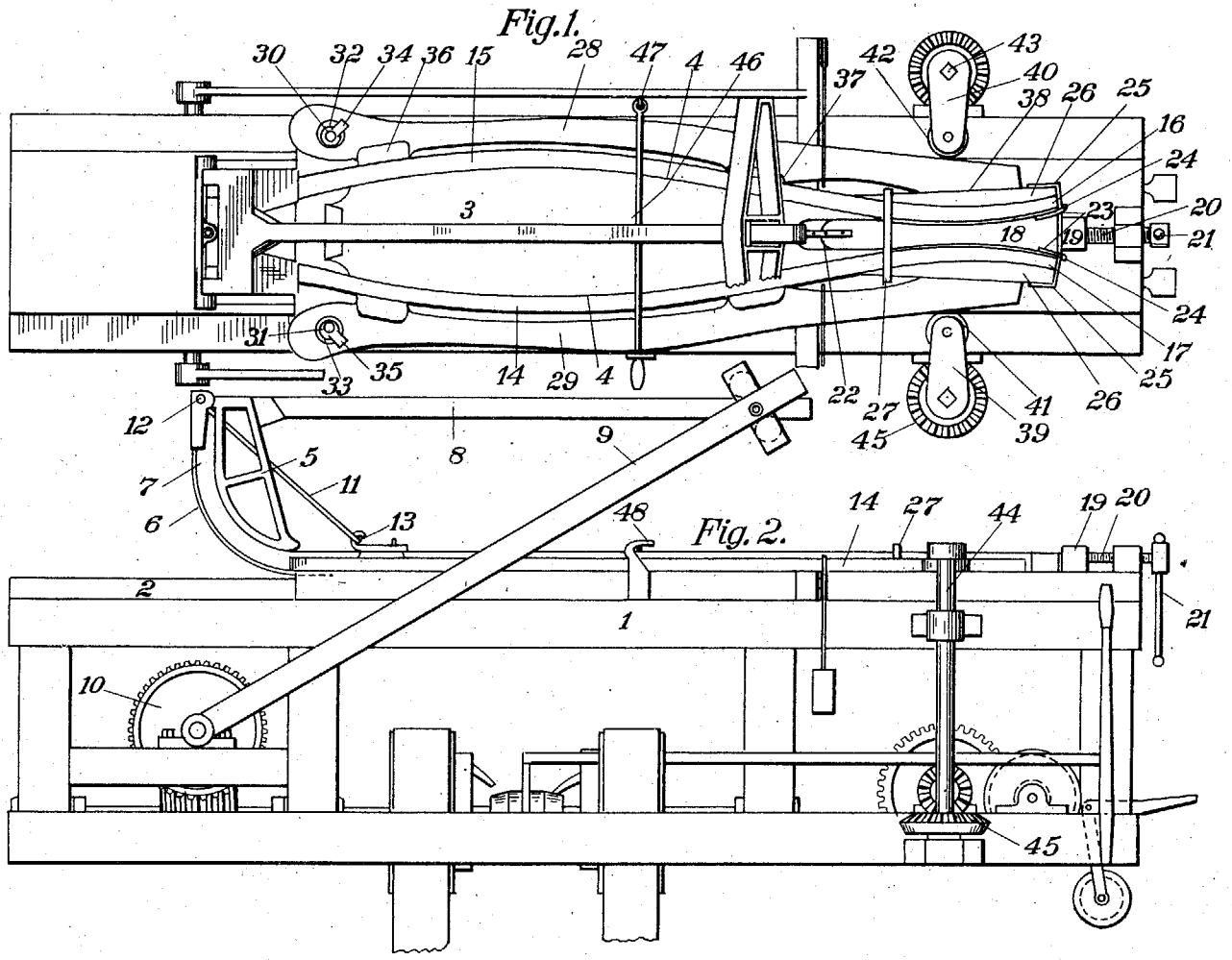
Paschal P. Dyke Inventor
Witnesses
R. Meiklejohn
A. Rager.
Geo. W. Rightmire
Attorney
THE NORRIS PETERS CO., WASHINGTON, D. C.

UNITED STATES PATENT OFFICE.

PASCHAL P. DYKE, OF SIDNEY, OHIO.

SHAFT-BENDING MACHINE.

No. 12,850. Specification of Reissued Letters Patent. Reissued Sept. 8, 1908.

Original No. 886,359, dated May 5, 1908, Serial No. 385,909. Application for reissue filed July 18, 1908. Serial No. 444,413.

*To all whom it may concern:*

Be it known that I, PASCHAL P. DYKE, a citizen of the United States, residing at Sidney, in the county of Shelby and State of Ohio, have invented certain new and useful Improvements in Shaft-Bending Machines, of which the following is a specification.

My invention relates to improvements in shaft bending machines, and has especial reference to the construction of the clamp devices which are applied to the outer portions of the shafts in order to cause the same to contact closely with the former or formers employed for giving the shaft the proper curvature in different portions of its length.

I contemplate the provision of a clamping construction pivotally mounted, its pivot being preferably arranged so that the clamp may be set at a greater or less distance from the outer face of the shaft, said clamp extending practically from one end of said shaft to the other, and being applied throughout the length thereof to give the same the proper curvature as determined by the shape of the former or formers applied to the inner face of the shaft. With these and other advantages in mind I provide a construction one embodiment of which is shown in the drawings in which Figure 1 is a plan view of my improved clamping devices in place, two shafts being formed simultaneously; Fig. 2 is a side elevation of a bending machine and shaft having my improved clamp applied thereto.

Referring to the drawings, in which the same numerals indicate identical parts throughout, 1 is the frame work of the bending machine having thereon the table 2 upon which the forming devices are arranged.

3 designates the former for the rear portion of the shafts, and is seen to have convex sides 4; this is located appropriately upon the table 2. A device for bending the rear end portion of the shaft is shown at the convex former 5, the strap 6 engaging the convex face of the shaft end 7, the said shaft end being bent upwardly through the mechanism shown generally at 8, 9 and 10. This forms no feature of my invention and need not be further described. When the end 7 of the shaft has assumed the proper degree of curvature, the hook rod 11, secured to the end former at 12, is secured to the catch 13, whereby the shaft is held in its bent position.

The shafts are shown at 14 and 15, it being preferable to bend two shafts at the same time, inasmuch as only one former 3 is necessary for that purpose. Between the outer ends 16 and 17 of the shafts is interposed a tip-former 18, which is adapted to be pushed inwardly by the head block 19 on the screw 20, turned by the lever 21. The tip-former 18, as it is pushed inwardly, engages a strap 22, secured at its ends to the arms 23, hinged at 24 to the bent arms 25, the latter engaging the end of the shaft and the end of the tip-clamp 26, which is properly curved on its inner face and positioned against the outer face of the shaft. At their opposite ends, the tip-clamps 26 are reduced and are secured upon the shafts by the clasp member 27.

The inner ends of the shafts being positioned as shown, the tip-clamps are positioned, the bent arms 25 are placed thereon to engage the ends of said tip-clamps and the shaft proper, the strap 22 therefore lying between the shaft ends; the tip-former 18 is then positioned and power is applied thereto through the lever 21, screw 20, and head 19, and the said tip-former is forced inwardly against the strap 22, thereby setting up a stress in the molecules of the shafts, compressing the same, so that the wood may be able to endure the bending stress applied through the clamps now about to be described.

The foregoing operation having been performed, the side clamp members 28 and 29 are next applied to the outer faces of the shafts. These clamps are pivoted at 30 and 31, the pivot openings therethrough being preferably enlarged. In these pivot openings are positioned eccentric members 32 and 33 bearing the lugs 34 and 35, by which said eccentric members may be rotated. In this manner, the clamps are seated nearer to or farther away from the adjacent portions of the shafts, as desired. The said clamps contain the extensions 36 and 37, which engage the shaft at appropriate points, it being understood that these extensions alone engage with the outer face of the shaft, the clamp standing away from the body of the shaft throughout the greater portion of its length. The clamp further has the smooth faced portion 38 adapted to contact with the tip-clamp 26 to force the latter into engagement with the shaft end, thereby imparting to the said end the proper form of degree or curvature. The clamps 28 and 29 are formed in the same manner each to engage a shaft, and being pivoted at points 30 and 31 it is necessary, in order to bring said clamps into proper engagement with said shafts, only to apply pressure to the forward portions of the clamps, and this is appropriately applied in the vicinity of the smooth faced portion 38, already described. The inward pressure upon the said clamps 28 and 29 is provided by means of the swinging arms 39 and 40 bearing at their engaging ends the anti-frictional rollers 41 and 42; a description of the manner of operating one of these arms will suffice. The arm 40 is positioned upon the upper squared end 43 of the shaft 44, the latter being rotated in a well understood manner through the bevel gearing 45. It is readily seen that the arm 40 may be swung into or out of contact with the clamp member 28, and that the length of the arm 40 will determine the degree of inward movement that may be imparted to the end of the said clamp member, thereby also determining the pressure to be applied to the shaft throughout its length.

The shaft and former and clamp members are secured in proper position upon the table 2 by means of the tie-rod 46, engaging in a ring 47 at one end, and being adapted to engage with the fixed hook 48 at its other end; in this manner any tendency of the parts to rise from their horizontal position under pressure is averted.

Details of the construction showing the manner of operating are outlined conventionally in the drawings, but inasmuch as they relate to the operation of the machine in parts which are not new and which form no feature of this invention, they are not herein specifically described, the intention being only to describe enough of the mechanism to make clear the manner of operation of my improved clamping devices. The idea of providing formers to lie between two shafts and of applying power to the outer faces of said shafts to compel them to conform to the former, is not new, and is not claimed herein. It is seen, therefore, that the novelty herein claimed resides in the provision of one side clamping member for each shaft and the devices for bringing this into contact with the shaft at appropriate points.

Having thus described my invention, what I claim is:—

1. In a shaft bending machine having a former thereon for the body of the shaft, a tip-former and a tip clamp, a clamp member pivotally mounted adjacent to the inner end of said shaft and adapted to be swung on its pivot to engage said shaft practically throughout the length thereof, and also to engage said tip clamp, a swinging arm for forcing said clamp member inwardly on its pivot to engage said tip clamp and said shaft, whereby said shaft is given its lateral curvature at one operation.

2. In a shaft bending machine having a former for the body of said shaft, a tip-former and a tip-clamp, a clamp member pivotally mounted adjacent the inner end of said shaft and extending to a point adjacent the outer end of said shaft, and means for applying pressure to the free end of said clamp member to force the same into engagement with said tip-clamp and said shaft body practically throughout the length of the latter, whereby said shaft is given its lateral curvature at one operation, and adjustable means for positioning said clamp member upon its pivot.

3. In a shaft bending machine having a former for the body of said shaft, a tip-former and a tip-clamp, a clamp member pivotally mounted adjacent the inner end of said shaft and extending to a point adjacent the outer end of said shaft, and means for applying pressure to the free end of said clamp member to force the same into engagement with said tip-clamp and said shaft body practically throughout the length of the latter, whereby said shaft is given its lateral curvature at one operation, and eccentric means mounted upon said pivot for positioning said clamp member with respect to said shaft.

4. In a shaft bending machine having appropriate body and tip-formers, a clamp member pivotally mounted adjacent one end thereof for forcing said shaft into engagement with said formers and extending practically throughout the length of said shaft, projections on said clamp member for engaging said shaft, eccentric means for positioning said clamp member upon its pivot relative to said shaft, and means adapted to be applied to said clamp member adjacent its free end for forcing said member into engagement with said shaft at points distributed practically throughout its length, whereby said shaft is given its lateral curvature at one operation.

5. In a shaft bending machine having appropriate body and tip formers, a clamp member pivotally mounted adjacent one end thereof for forcing said shaft into engagement with said formers and extending practically throughout the length of said shaft, projections on said clamp member for engaging said shaft, and means adapted to be applied to said clamp member adjacent its free end for forcing said member into engagement with said shaft at points distributed practically throughout its length, whereby said shaft is given its lateral curvature at one operation.

In testimony whereof I have hereunto subscribed my name in the presence of two witnesses.

PASCHAL P. DYKE.

Witnesses:

VERNON THOMPSON,
ROYEN GRAY HESS.